(12) United States Patent
Queisser et al.

(10) Patent No.: US 6,852,662 B2
(45) Date of Patent: Feb. 8, 2005

(54) CATALYST SYSTEMS BASED ON TRANSITION METAL COMPLEXES FOR CARBON MONOXIDE COPOLYMERIZATION IN AN AQUEOUS MEDIUM

(75) Inventors: Joachim Queisser, Mannheim (DE); Michael Slany, Kirchheim (DE); Michael Geprägs, Lambsheim (DE); Ekkehard Lindner, Tübingen (DE); Markus Schmid, Pfullingen (DE); Joachim Wald, Albstadt-Ebingen (DE); Peter Wegner, Tübingen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/692,334

(22) Filed: Oct. 24, 2003

(65) Prior Publication Data

US 2004/0092682 A1 May 13, 2004

Related U.S. Application Data

(62) Division of application No. 09/719,975, filed as application No. PCT/EP99/04311 on Jun. 22, 1999, now abandoned.

(30) Foreign Application Priority Data

Jul. 2, 1998 (DE) .......................... 198 29 520

(51) Int. Cl.⁷ .............. C08G 67/02; B01J 31/18
(52) U.S. Cl. .............. 502/162; 502/167; 502/171; 528/392
(58) Field of Search ............. 502/162, 167, 502/171; 528/392

(56) References Cited

U.S. PATENT DOCUMENTS

| | | |
|---|---|---|
| 5,171,832 A | 12/1992 | Keijsper |
| 5,175,244 A | 12/1992 | Budzelaar et al. ......... 528/392 |
| 5,247,065 A | 9/1993 | van Doorn et al. |
| 5,352,767 A | 10/1994 | Chien .................. 528/392 |
| 5,369,073 A | 11/1994 | Somazzi et al. .......... 502/162 |
| 5,488,096 A | 1/1996 | Drent et al. ............. 528/392 |
| 5,506,338 A | 4/1996 | Hanna et al. ............ 528/392 |
| 5,521,281 A | 5/1996 | Sen et al. ............... 528/392 |
| 5,631,345 A | 5/1997 | Takaya et al. ........... 258/392 |
| 5,654,250 A | 8/1997 | Van Der Veer et al. .... 502/162 |
| 5,670,610 A | 9/1997 | Somazzi et al. .......... 528/392 |
| 5,688,909 A | 11/1997 | Drent et al. ............. 528/392 |
| 5,830,989 A | 11/1998 | Cooley et al. |
| 5,952,456 A | 9/1999 | Bradford et al. ......... 528/392 |
| 6,541,564 B2 | 4/2003 | Schmid et al. ........... 524/801 |

FOREIGN PATENT DOCUMENTS

| | | |
|---|---|---|
| EP | 121965 | 10/1984 |
| EP | 280374 | 8/1988 |
| EP | 296687 | 12/1988 |
| EP | 305011 | 3/1989 |
| EP | 357101 | 3/1990 |
| EP | 428228 | 5/1991 |
| EP | 460743 | 12/1991 |
| EP | 485035 | 5/1992 |
| EP | 590942 | 4/1994 |
| EP | 702045 | 3/1996 |
| EP | 792902 | 9/1997 |
| EP | 800852 | 10/1997 |
| WO | 98/22482 | 5/1998 |
| WO | 98/25939 | 6/1998 |

OTHER PUBLICATIONS

Drent et al., *Chem. Rev.*, 1996, 96, 663–681.
Jiang et al., *Macromolecules*, 1994, 27, 7215–7216.
Verspui et al., *Chem. Commun.*, 1998, 401–402.
Herrmann et al,. *Chem.Int.Ed.Engl.*, 1995, 37:7, 811–813.
Baxley et al., *J.Mol.Cat.Chem.*, 116, 1997, 191–198.
Baxley et al., *Inorg.Chem.*, 1996, 35, 6688–6693.
Lindner et al., *J. Org.Chem.*, 2000, 602, 173–187.
U.S. Appl. No. 09/719,813, filed Dec. 18, 2000, Queisser et al.
Bartik et al., *Inorg. Chem.*, 1994, 33,164.
Hamed et al., *Organometallics*, 1998, 17, 5184.
Chen et al., *Polyhedron*, 1998,17, 2271.
Verspui et al,. *Angew.Chem., Int. Ed. Engl.*, 2000, 39, 804–806.

*Primary Examiner*—Caixia Lu
(74) *Attorney, Agent, or Firm*—Keil & Weinkauf

(57) ABSTRACT

Catalyst systems for the copolymerization of carbon monoxide and α-olefinically unsaturated compounds contain, as essential components, a) a metal complex of the formula (I)

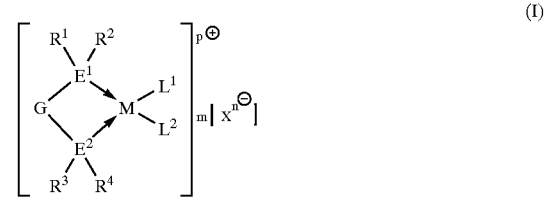

where $R^1$ to $R^4$ are each linear or branched $C_2$- to $C_{28}$-alkyl, $C_3$- to $C_{14}$-cycloalkyl or alkylaryl where the alkyl moiety is of 1 to 28 carbon atoms and the aryl moiety is of 6 to 15 carbon atoms, each of which is substituted by at least one polar protic or ionic functional group based on elements of groups IVA to VIA of the Periodic Table of Elements, and b) if required, one or more Lewis or protic acids or a mixture of Lewis and protic acids.

2 Claims, No Drawings

CATALYST SYSTEMS BASED ON TRANSITION METAL COMPLEXES FOR CARBON MONOXIDE COPOLYMERIZATION IN AN AQUEOUS MEDIUM

This is a divisional of application Ser. No. 09/719,975 filed on Dec. 18, 2000, now abn. which is the National Stage of international application no. PCT/EP 99/04311 filed Jun. 22, 1999.

The present invention relates to catalyst systems for the copolymerization of carbon monoxide and α-olefinically unsaturated compounds, containing, as essential components, a) a metal complex of the formula (I)

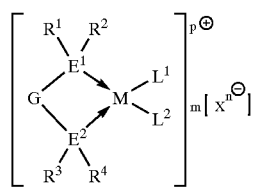

where
G is —$(CR^b{}_2)_r$—, —$(CR^b{}_2)_s$—Si$(R^a)_2$—$(CR^b{}_2)_t$—, -A'—O—B'— or -A'-Z$(R^5)$—B'—, $R^5$ is hydrogen, or is $C_1$- to $C_{28}$-alkyl, $C_3$- to $C_{14}$-cycloalkyl, $C_6$- to $C_{15}$-aryl or alkylaryl where the alkyl radical is of 1 to 20 carbon atoms and the aryl radical is of 6 to 15 carbon atoms, each of which is unsubstituted or substituted by functional groups based on the elements of groups IVA, VA, VIA or VIIA of the Periodic Table of Elements, or is —N$(R^b)_2$, —Si$(R^c)_3$ or a radical of the formula II

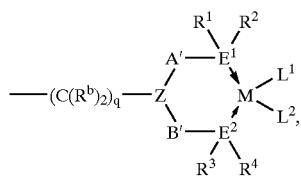

where
q is an integer from 0 to 20 and the further substituents in (II) have the same meanings as in (I), A' and B' are each —$(CR^b{}_2)_r$—, —$(CR^b{}_2)_s$—Si$(R^a)_2$—$(CR^b{}_2)_t$—, —N$(R^b)$—, an r'-, s- or t-atom component of a ring system or, together with Z, an (r'+1)-, (s+1)- or (t+1)-atom component of a heterocyclic structure, $R^a$ independently of one another, are each $C_1$- to $C_{20}$-alkyl, $C_3$- to $C_{10}$-cycloalkyl, $C_6$- to $C_{15}$-aryl or alkylaryl where the alkyl moiety is of 1 to 10 carbon atoms and the aryl moiety is of 6 to 15 carbon atoms, $R^b$ is the same as $R^a$ or is hydrogen or Si$(R^c)_3$, $R^c$ is $C_1$- to $C_{20}$-alkyl, $C_3$- to $C_{10}$-cycloalkyl, $C_6$- to $C_{15}$-aryl or alkylaryl where the alkyl moiety is of 1 to 10 carbon atoms and the aryl moiety is of 6 to 15 carbon atoms, r is 1, 2, 3 or 4,
r' is 1 or 2,
s and t are each 0, 1 or 2, where $1 \leq s+t \leq 3$,
z is a nonmetallic element from group VA of the Periodic Table of Elements, M is a metal selected from the group VIIIB, IB or IIB of the Periodic Table of Elements, $E^1$ and $E^2$ are each a nonmetallic element from group VA of the Periodic Table of Elements, $R^1$ to $R^4$ are each linear or branched $C_2$- to $C_{28}$-alkyl, $C_3$- to $C_{14}$-cycloalkyl or alkylaryl where the alkyl moiety is of 1 to 28 carbon atoms and the aryl moiety is of 6 to 15 carbon atoms, each of which is substituted by at least one polar protic or ionic functional group based on elements of groups IVA to VIA of the Periodic Table of Elements, $L^1$ and $L^2$ are formally charged or neutral ligands,
X are formally monovalent or polyvalent anions,
p is 0, 1, 2, 3 or 4,
m and n are each 0, 1, 2, 3 or 4,
and p=m×n, and b) if required, one or more Lewis or protic acids or a mixture of Lewis and protic acids.

The present invention furthermore relates to the use of these catalyst systems for the preparation of linear, alternating copolymers of carbon monoxide and α-olefinically unsaturated compounds and processes for the preparation of said copolymers in an aqueous medium.

Processes, catalyzed by transition metals, for the preparation of linear, alternating copolymers of carbon monoxide and α-olefinically unsaturated compounds, also referred to for short as carbon monoxide copolymers or polyketones, are known. For example, a cis-palladium complex chelated with bidentate phosphine ligands, [Pd(Ph$_2$P(CH$_2$)$_3$PPh$_2$)](OAc)$_2$ (Ph=phenyl, Ac=acetyl), is used in EP-A 0 121 965. The carbon monoxide copolymerization can be carried out in suspension, as described in EP-A 0 305 011, or in the gas phase, for example according to EP-A 0 702 045 Frequently used suspending media are on the one hand low molecular weight alcohols, in particular methanol (also see EP-A 0 428 228), and on the other hand nonpolar or polar aprotic liquids, such as dichloromethane, toluene or tetrahydrofuran (cf. EP-A 0 460 743 and EP-A 0 590 942). Complex compounds having bisphosphine chelate ligands whose radicals on the phosphorus are aryl or substituted aryl groups have proven particularly suitable for said polymerization processes. Accordingly, 1,3-bis(diphenylphosphine)propane and 1,3-bis[di(o-methoxyphenyl)phosphine)]propane are particularly frequently used as chelate ligands (also see Drent et al., Chem. Rev., 1996, 96, 663–681). Usually, the carbon monoxide copolymerization is carried out in the stated cases in the presence of acids.

The carbon monoxide copolymerization in low molecular weight alcohols, such as methanol, has the disadvantage that the carbon monoxide copolymer formed has high absorptivity for these liquids and up to 80% by volume of, for example, methanol are bound or absorbed by the carbon monoxide copolymer. Accordingly, a large amount of energy is required to dry the carbon monoxide copolymers and to isolate them in pure form. Another disadvantage is that residual amounts of alcohol still remain in the carbon monoxide copolymer even after an intensive drying process. Molding materials prepared in this manner are therefore unsuitable from the outset for use as packaging material for food. EP-A 0 485 035 proposes the use of additions of water in amounts of from 2.5 to 15% by weight to the alcoholic suspending medium in order to eliminate the residual amounts of low molecular weight alcohol in the carbon monoxide copolymer. However, this procedure too does not lead to methanol-free copolymers. The use of halogenated hydrocarbons or aromatics, such as dichloromethane or chlorobenzene or toluene, on the other hand, gives rise to problems, in particular in handling and disposal.

For overcoming the disadvantages associated with said suspending media, Jiang and Sen, Macromolecules, (1994), 27, 7215–7216, describe the preparation of linear, alternating carbon monoxide copolymers in aqueous systems using a catalyst system consisting of [Pd(CH$_3$CN)$_4$] (BF$_4$)$_2$ and 1,3-bis [di(3-sulfophenyl)phosphine]propane as a water-soluble chelate ligand. However, the catalyst activity achieved is very low and therefore unsuitable for a large-scale industrial preparation.

Verspui et al., Chem. Commun., 1998, 401–402, succeed, in comparison with Jiang and Sen, in increasing the catalyst activity in the copolymerization of carbon monoxide and ethene, by using said chelate ligand in substantially purer form, owing to an improved synthesis method (cf. also Hermann et al., Angew. Chem. Int. Ed. Engl., 1995, 34, 811 et seq.). Furthermore, the presence of a Bronsted acid is required in order to obtain catalyst activities improved in comparison with Jiang and Sen. Although the chelate ligand 1,3-bis[di(3-sulfophenyl)phosphine]propane can be prepared in purer form with the aid of an improved synthesis method, this by no means demonstrates how it is possible to obtain suitable chelate ligands having other substitution patterns. Thus, the water-soluble transition metal complexes described are limited exclusively to sulfonated aromatic substituents on the phosphorus. The preparation of these chelate ligands furthermore requires the handling of very aggressive substances, such as boric acid, concentrated sulfuric acid and oleum. An extension to other systems is in principle not possible, owing to the given structure.

It is therefore desirable to be able to use, for the copolymerization of carbon monoxide an α-olefinically unsaturated compounds in aqueous systems, catalyst systems which from the outset permit a large number of different substituents on the chelate ligand and at the same time enable constantly good reproducibility in combination with high efficiency.

It is an object of the present invention to provide, for the preparation of linear, alternating carbon monoxide copolymers, catalyst systems which are suitable for the copolymerization in an aqueous medium. It is a further object of the present invention to provide processes which give, with reproducibly good catalyst activity, linear, alternating carbon monoxide copolymers in an aqueous medium in the presence of said catalyst systems.

We have found that these objects are achieved by the catalyst systems defined at the outset and by their use for the preparation of linear, alternating carbon monoxide copolymers and a process for the preparation of these carbon monoxide copolymers.

Preferred novel catalyst systems contain, as active compounds a) a metal complex of the formula (Ia)

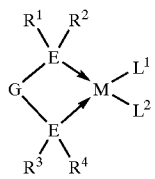

(Ia)

where
G is —(CR$^b_2$)$_r$— or —(CR$^b_2$)—N(R$^5$)—(CR$^b_2$)—,
R$^b$ is hydrogen, C$_1$- to C$_{10}$-alkyl or C$_6$- to C$_{10}$-aryl,
r is 1, 2, 3 or 4,
R$^5$ is hydrogen, C$_1$- to C$_{10}$-alkyl, C$_3$- to C$_{10}$-cycloalkyl, C$_6$- to C$_{15}$-aryl, or C$_1$- to C$_{10}$-alkyl, C$_3$- to C$_{10}$-cycloalkyl or C$_6$- to C$_{15}$-aryl, each of which is substituted by functional groups based on elements of groups IVA, VA, VIA and VIIA of the Periodic Table of Elements,
M is palladium or nickel
E$^1$ and E$^2$ are each phosphorus,
R$^1$ to R$^4$ are each a linear, branched or carbocycle-containing C$_2$- to C$_{28}$-alkyl unit or C$_3$- to C$_{14}$-cycloalkyl unit which has at least one terminal or internal hydroxyl, amino, carboxyl, phosphoric acid, ammonium or sulfo group, or an alkylaryl group where the alkyl moiety is of 1 to 20 carbon atoms and the aryl moiety is of 6 to 15 carbon atoms, the alkyl or aryl moiety being substituted by at least one hydroxyl, carboxyl, amino acid, phosphoric acid, ammonium or sulfo group,
L$^1$ and L$^2$ are each acetate, trifluoroacetate, tosylate or halide, and
b) sulfuric acid, p-toluenesulfonic acid, tetrafluoroboric acid, trifluoromethanesulfonic acid, perchloric acid or trifluoroacetic acid as the protic acid or boron trifluoride, antimony pentafluoride or a triarylborane as the Lewis acid.

In a further embodiment, a preferred catalyst system is one in which R$^1$ to R$^4$ in the metal complex (I) are each C$_2$- to C$_{28}$-alkyl, C$_3$- to C$_{14}$-cycloalkyl or alkylaryl where the alkyl moiety is of 1 to 28 carbon atoms and the aryl moiety is of 6 to 15 carbon atoms, each of which is substituted by at least one free carboxyl or sulfo group, the presence of external Lewis or protic acids b) being completely dispensed with.

In principle, bidentate chelate ligands of the formula (R$^1$)(R$^2$)E$^1$-G-E$^2$(R$^3$) (R$^4$) (III) in which the substituents and indices have the abovementioned meanings are suitable as a component of the transition metal complexes (I) or of the novel catalyst system.

The bridging structural unit G in the metal complexes (I) or in the chelate ligands (III) of the novel catalyst system consists in general of monoatomic or polyatomic bridge segments. A bridging structural unit is understood in principle as meaning a group which links the elements E$^1$ and E$^2$ to one another. Such structural units include, for example, substituted or unsubstituted alkylene chains or those alkylene chains in which an alkylene unit is replaced by a silylene group, an amino or phosphino group or an ether oxygen.

Preferred monoatomically bridged structural units are those having a bridging atom from the group IVA of the Periodic Table of Elements, such as —C(R$^b$)$_2$— or —Si(R$^a$)$_2$—, where R$^a$, independently of one another, are each in particular linear or branched C$_1$- to C$_{10}$-alkyl, for example methyl, ethyl, isopropyl or tert-butyl, C$_3$- to C$_6$-cycloalkyl, such as cyclopropyl or cyclohexyl, C$_6$- to C$_{10}$-aryl, such as phenyl or naphthyl, C$_6$- to C$_{10}$-aryl substituted by functional groups based on the nonmetallic elements of groups IVA, VA, VIA or VIIA of the Periodic Table, for example tolyl, (trifluoromethyl)phenyl, dimethylaminophenyl, p-methoxyphenyl or partially halogenated or perhalogenated phenyl, or aralkyl where the alkyl moiety is of 1 to 6 carbon atoms and the aryl moiety is of 6 to 10 carbon atoms, for example benzyl, and R$^b$ is in particular hydrogen and may furthermore have the meanings stated above for R$^a$. R$^a$ is in particular methyl and R$^b$ is in particular hydrogen.

Among the polyatomically bridged systems, the diatomically, triatomically and tetraatomically bridged structural units are to be singled out, the triatomically bridged systems generally preferably being used.

Suitable triatomically bridged structural units are based in general on a chain of carbon atoms, for example propylene (—CH$_2$CH$_2$CH$_2$—), or on a bridge unit having a hetero atom from group IVA, VA or VIA of the Periodic Table of Elements, such as silicon, nitrogen, phosphorus or oxygen, in the chain skeleton.

The bridge carbon atom can in general be substituted by C$_1$- to C$_6$-alkyl, such as methyl, ethyl or tert-butyl, by C$_6$- to C$_{10}$-aryl, such as phenyl, or by functional groups based on elements of groups IVA, VA, VIA or VIIA of the Periodic Table of Elements, for example triorganosilyl, dialkylamino, alkoxy, hydroxyl or halogen. Suitable substituted propylene bridges are, for example, those having a methyl, phenyl, hydroxyl, trifluoromethyl, ω-hydroxyalkyl or methoxy group in the 2 position.

Among the polyatomically bridged structural units having a hetero atom in the chain skeleton, advantageously used compounds are those in which Z is nitrogen or phosphorus, in particular nitrogen (cf. also formula (I)). R$^5$ on Z may be in particular hydrogen, linear or branched C$_1$- to C$_{28}$-alkyl, in particular C$_1$- to C$_{20}$-alkyl, such as methyl, ethyl, isopropyl, tert-butyl, n-hexyl or n-dodecyl, C$_3$- to C$_{14}$-cycloalkyl, in particular C$_3$- to C$_8$-cycloalkyl, such as cyclopropyl or cyclohexyl, C$_6$- to C$_{15}$-aryl, in particular C$_6$- to C$_{10}$-aryl, for example phenyl, or alkylaryl where the alkyl radical is of 1 to 20 carbon atoms and the aryl radical is of 6 to 10 carbon atoms, for example benzyl.

Said alkyl and aryl radicals include both ,unsubstituted and substituted compounds. The substituted compounds may contain, for example, functional groups based on the elements of groups IVA, VA, VIA or VIIA of the Periodic Table of Elements. Suitable, inter alia, are triorganosilyl groups, such as trimethylsilyl or tert-butyldiphenylsilyl, carboxyl or carboxylic acid derivatives such as esters or amides, primary, secondary or tertiary amino, such as dimethylamino or methylphenylamino, nitro, hydroxyl, alkoxy, such as methoxy or ethoxy, sulfonate group or halogen, such as fluorine, chlorine or bromine. For the purpose of the present invention, aryl includes substituted or unsubstituted heteroaryl, for example pyridyl or pyrrolyl. Alkyl radicals R$^5$ also include long-chain alkylene having 12 to 22 carbon atoms in the chain, which may also have polar protic or ionic functional groups, such as sulfo, carboxyl, hydroxyl, amino or ammonium, for example in the terminal position.

Other preferred radicals R$^5$ are those which have an electron-attracting substituent. Examples of suitable electron-attracting substituents are alkyl groups having one or more electron-attracting radicals, such as fluorine, chlorine, nitrile or nitro, α or β to Z. Also suitable are aryl groups having said electron-attracting radicals and, as radicals bonded directly to Z, also the nitrile, sulfonate and nitro groups. Examples of suitable electron-attracting alkyl radicals are trifluoromethyl, trichloroethyl, difluoromethyl, 2,2,2-trifluoroethyl, nitromethyl and cyanomethyl. Examples of suitable electron-attracting aryl radicals are m-, p- and o-fluoro- and chlorophenyl, 2,4-difluorophenyl, 2,4-dichlorophenyl, 2,4,6-trifluorophenyl, 3,5-bis(trifluoromethyl)phenyl, nitrophenyl, 2-chloro-5-nitrophenyl and 2-bromo-5-nitrophenyl. In this context, carbonyl units are also suitable as R$^5$ so that, if Z is nitrogen, Z and R$^5$ form a carboxamido functional group. Examples of suitable radicals of this type are acetyl and trifluoroacetyl.

R$^5$ is particularly preferably tert-butyl, phenyl, p-fluorophenyl, trifluoromethyl, 2,2,2-trifluoroethyl, pentafluorophenyl, 3,5-bis(trifluoromethyl)phenyl and ortho-difluorophenyl, e.g. 3,4-difluorophenyl, meta-difluorophenyl, e.g. 2,4-difluorophenyl, or para-difluorophenyl, e.g. 2,5-difluorophenyl.

Suitable units A' and B' in the formulae (I) to (III) are C$_1$- to C$_4$-alkylene units in substituted or unsubstituted form, for example methylene, ethylene, propylene or ethylidene, propylidene and benzylidene. Methylene, ethylene, ethylidene or benzylidene is preferably used, particularly preferably methylene.

A' and B' may also be a monoatomic, diatomic, triatomic or tetraatomic component of an aliphatic or aromatic ring system. For example, A' and B' may be a methylene or ethylene unit of a cyclopropyl, cyclopentyl or cyclohexyl ring. Suitable ring systems are also aliphatic and aromatic heterocycles.

A' and B' may furthermore be a component of a heterocycle which is formed from the components A'-Z-R$^5$ or B'-Z-R$^5$, i.e. A'-Z-R$^5$ or B'-Z-R$^5$ may be, for example, a substituted or unsubstituted pyrrolidine or piperidine ring.

Suitable chelating atoms E$^1$ and E$^2$ are, independently of one another, the nonmetallic elements of group VA of the Periodic Table of Elements, nitrogen and phosphorus being preferably used, in particular phosphorus. In a preferred embodiment, E$^1$ and E$^2$ in the compounds (I) and (III) are each phosphorus.

In the novel catalyst systems, R$^1$ to R$^4$ are each C$_2$- to C$_{28}$-alkyl, preferably C$_3$- to C$_{20}$-alkyl, C$_3$- to C$_{14}$-cycloalkyl, preferably C$_3$- to C$_8$-cycloalkyl, or alkylaryl where the alkyl moiety is of 1 to 28, preferably 3 to 20, carbon atoms and the aryl moiety is of 6 to 15, preferably 6 to 10, carbon atoms, each of which is substituted by a polar protic or ionic functional group based on elements of groups IVA to VIA of the Periodic Table of Elements. R$^1$ to R$^4$ are preferably each linear, branched or carbocycle-containing C$_2$- to C$_{28}$-alkyl units or C$_3$- to C$_{14}$-cycloalkyl units which have at least one terminal or internal hydroxyl, carboxyl, phosphoric acid, ammonium, amino acid or sulfo group, or alkylaryl where the alkyl moiety is of 1 to 28 carbon atoms and the aryl moiety is of 6 to 15 carbon atoms, the alkyl or aryl moiety being substituted by at least one hydroxyl, carboxyl, phosphoric acid, ammonium, amino acid or sulfo group.

It is also possible to use salts of the carboxylic, phosphoric, amino or sulfonic acids. Suitable salts are, for example alkali metal or alkaline earth metal salts, such as sodium, potassium or magnesium carboxylates or sulfonates.

Particularly suitable opposite ions for said ammonium radicals are non-nucleophilic anions, as also used for the transition metal complexes (I) (cf. anions X). For example, p-toluenesulfonate, tetrafluoroborate, trichloroacetate and hexafluorophosphate are particularly suitable.

Particularly suitable alkyl radicals R$^1$ to R$^4$ are, for example, alkylene units having one or two terminal hydroxyl, carboxyl, sulfo or ammonium groups. Furthermore, R$^1$ to R$^4$ may also have more than two polar groups, for example four or six hydroxyl, ammonium or carboxyl groups. Accordingly, R$^1$ to R$^4$ in a chelate compound (III) may each also have different functional groups. R$^1$ to R$^4$ may also have functional groups in numbers differing from one another. Suitable radicals R$^1$ to R$^4$ are, for example, compounds of the formula (IV):

where

R$^d$ has the same meaning as R$^b$ or is Y,

T is C$_3$- to C$_{10}$-cycloalkylene, in particular C$_3$- to C$_6$-cycloalkylene, or C$_6$- to C$_{15}$-arylene, in particular C$_6$- to C$_{10}$-arylene, unsubstituted or substituted by R$^d$ or Y, k is from 0 to 20 if 1 is 0 or 1 and T is cycloalkyl, and is from 1 to 20 if 1 is 1 and T is aryl, k' is from 0 to 20,
l is 0 or 1 and
Y is a polar protic or ionic functional group based on elements of groups IVA to VIA of the Periodic Table of Elements.

Suitable radicals Y are the hydroxyl, amino acid, carboxyl, phosphoric acid, ammonium and sulfo group. Preferred cycloaliphatic radicals T are cyclopentyl and cyclohexyl and the preferred aryl or arylene unit T is phenyl or phenylene, respectively. As a rule, k is from 2 to 20, preferably from 3 to 18, and k' is preferably from 0 to 10, in particular from 1 to 8.

The preparation of suitable propylene-bridged compounds having chelate ligands can be carried out, for example, starting from the commercially available 1,3-dibromopropane. A double Arbuzov reaction, for example with triethyl phosphite, gives 1,3-bisphosphonic acid derivatives, which can be converted by reduction, as described in Methoden der organischen Chemie (Houben-Weyl), 4th Edition, Volume XII/1, Part 1, Georg Thieme Verlag, 1963, page 62, into 1,3-diphosphinopropane. Suitable reducing agents are, for example, lithium aluminum hydride and diisobutyl aluminum hydride. Via a hydrophosphination reaction with functionalized olefins, 1,3-diphosphinopropane provides a flexible route to substituted bisphosphines. The hydrophosphination takes place in general via a free radical mechanism and can be initiated thermally, photochemically or with the aid of a free radical initiator. For thermal initiation, in general temperatures of from 20 to 100° C. and pressures of from 0.1 to 5 bar are required. A suitable free radical initiator is, for example, di-tert-butyl peroxide or azobisisobutyronitrile. For photochemical initiation, as a rule the UV radiation of a high-pressure mercury lamp over a period of from 2 to 48 hours is sufficient for quantitative hydrophosphination. In general, anti-Markovnikov products are obtained in the hydrophosphination by means of processes involving free radical initiation.

For the preparation of chelate ligands having radicals $R^1$ to $R^4$ which carry carboxyl groups, it is proven advantageous to start from olefinically unsaturated compounds which have been derivatized with corresponding carboxylic ester groups and to use them in the hydrophosphination reaction. The free carboxylic acids can then be obtained by means of hydrolysis by known methods.

In addition, suitable compounds having chelate ligans can also be prepared under conditions of acid catalysis. The products obtained by this process are often present as a mixture owing to the isomerization of the olefinic double bond under the acidic reaction conditions. The hydrophosphination step is described, for example, in Methoden der organischen Chemie (Houben-Weyl), 4th Edition, Volume XII/1, Part 1, Georg Thieme Verlag, 1963, pages 25 to 28.

In general, all olefins covered by this class of compounds are suitable for said hydrophosphination reaction, provided that they have a polar protic or ionic functional group. For example, propylene radicals and $C_4$- to $C_{28}$-alkenes having at least one internal or terminal double bond, which have at least one hydroxyl, amino acid, carboxyl, phosphoric acid, ammonium or sulfo group, are suitable. Also suitable are olefinic compounds having aromatic radicals, it being possible for the functional group to be present both on the aliphatic and on the aromatic radical, for example 4-(1-pentenyl)benzoic acid or 3-phenylpent-5-enecarboxylic acid. Furthermore, olefinic compounds having aliphatic carbocyclic structures in the alkylene chain are suitable as substituents. Cyclic olefins, such as cyclohexen-3-ol or cycloocten-4-ol, may also be used. It is of course also possible to employ olefins having a plurality of polar protic or ionic functional groups. Suitable alkenes having an α-olefinic double bond are preferably used in the hydrophosphination reaction of the α, ω-bisphosphines. Suitable alkenes of this type include, for example, hetero atom-containing α-olefins, such as (meth)acrylates or (meth)acrylamides and homoallyl or allyl alcohols.

Particularly preferably used radicals $R^1$ to $R^4$ are those in which the hydrophilic character induced by the polar protic or ionic functional groups is sufficient to make the metal complex (I) completely water-soluble. The larger the number of functional groups on the radicals $R^1$ to $R^4$, the greater may be the lipophilic aliphatic or aliphatic-aromatic fraction. Examples of preferred radicals $R^1$ to $R^4$ each having a hydroxyl group are those having 2 to 15 carbon atoms in the alkyl unit.

In a particularly preferred embodiment of the chelate ligand (III), alkyl substituents $R^1$ to $R^4$ having a hydroxyl group are each of 4 to 12, in particular 4 to 7, carbon atoms, alkyl substituents $R^1$ to $R^4$ having a carboxyl group are each of 4 to 15, in particular 5 to 12, carbon atoms, alkyl substituents $R^1$ to $R^4$ having a sulfo group are each of 4 to 18, in particular 5 to 15, carbon atoms and alkyl substituents $R^1$ to $R^4$ having an ammonium group are each of 4 to 22, in particular 5 to 20, carbon atoms.

Examples of suitable chelate ligands (III) are 1,3-bis(di-5-hydroxypentyl)phosphinopropane,
1,3-bis(di-6-hydroxyhexyl)phosphinopropane,
1,3-bis(di-7-hydroxyheptyl)phosphinopropane,
1,3-bis(di-8-hydroxyoctyl)phosphinopropane,
1,3-bis(di(3-hydroxycyclopentyl)propyl)phosphinopropane,
1,3-bis[di-5-sulfopentyl]phospinopropane,
1,3-bis[di-6-sulfohexyl]phosphinopropane,
1,3-bis[di-7-sulfoheptyl]phosphinopropane,
1,3-bis[di-8-sulfooctyl]phosphinopropane,
1,3-bis[di(3-(sulfocyclopentyl)propyl]phosphinopropane,
1,3-bis(di-5-pentanoyl)phospinopropane,
1,3-bis(di-6-hexanoyl)phospinopropane,
1,3-bis(di-7-heptanoyl)phosphinopropane,
1,3-bis(di-8-octanoyl)phosphinopropane,
bis[(di-5-hydroxypentyl)phospinomethyl]phenylamine,
bis[(di-6-hydroxyhexyl)phosphinomethyl]phenylamine,
bis[(di-7-hydroxyheptyl)phosphinomethyl]phenylamine,
bis[(di-8-hydroxyoctyl)phosphinomethyl]phenylamine,
bis[(di(3-hydroxycyclopentyl)propyl]phenylamine,
bis[(di-5-(sulfopentyl)phosphinomethyl]phenylamine,
bis[(di-6-(sulfohexyl)phospinomethyl]phenylamine,
bis[(di-7-sulfoheptyl)phosphinomethyl]phenylamine,
bis[(di-8-sulfooctyl)phosphinomethyl)phenylamine,
bis[(di(3-sulfocyclopentyl)propyl)phospinomethyl]phenylamine,
bis[(di-5-pentanoyl)phospinomethyl]phenylamine
bis[(di-6-hexanoyl)phosphinomethyl]phenylamine,
bis[(di-7-heptanoyl)phosphinomethyl]phenylamine and
bis[(di-8-octanoyl)phosphinomethyl]phenylamine.

Particularly preferred among said compounds having chelate ligands are those in which $R^1$ to $R^4$ are each a hydroxyl- or carboxyl-substituted hexyl, octyl, cyclopentyl or cyclohexyl radical.

Suitable metals M of the novel catalyst system are the metals of groups VIIIB, IB and IIB of the Periodic Table of Elements, i.e. mainly the platinum metals, such as ruthenium, rhodium, osmium, iridium and platinum and very particularly preferably palladium, in addition to iron, cobalt and nickel. In the complexes (I), the metals may be formally neutral, formally bearing a single positive charge or preferably formally bearing a double positive charge.

Suitable formally charged inorganic ligands $L^1$ and $L^2$ are hydride, halides, sulfates, phosphates or nitrates. Carboxylates or salts of organic sulfonic acids, such as methylsulfonate, trifluoromethylsulfonate or p-toluenesulfonate, are also suitable. Among the salts of organic sulfonic acids, p-toluenesulfonate is preferred. Preferred formally charged ligands $L^1$ and $L^2$ are carboxylates, preferably $C_1$- to $C_{20}$-carboxylates, in particular $C_1$- to $C_7$-carboxylates, e.g. acetate, trifluoroacetate, propionate, oxalate, citrate or benzoate. Acetate is particularly preferred.

Suitable formally charged organic ligands $L^1$ and $L^2$ are also aliphatic $C_1$- to $C_{20}$-radicals, cycloaliphatic $C_3$- to $C_{30}$-radicals, $C_7$- to $C_{20}$-aralkyl radicals having $C_6$- to $C_{14}$-aryl radicals and $C_1$- to $C_6$-alkyl radicals and aromatic $C_6$ to $C_{20}$ radicals, for example methyl, ethyl, propyl, isopropyl, tert-butyl, n-pentyl, isopentyl, cyclohexyl, benzyl, phenyl and aliphatically or aromatically substituted phenyl radicals.

Suitable formally neutral radicals $L^1$ and $L^2$ are in general Lewis bases, i.e. compounds having at least one free electron pair. Particularly suitable are Lewis bases whose free electron pair or whose free electron pairs is or are present on a nitrogen or oxygen atom, for example nitriles, R—CN, ketones, ethers, alcohols or water. $C_1$- to $C_{10}$-nitriles, such as acetonitrile, propionitrile or benzonitrile, or $C_2$- to $C_{10}$-ketones, such as acetone or acetylacetone, or $C_2$- to $C_{10}$-ethers, such as dimethyl ether, diethyl ether or tetrahydrofuran, are preferably used. In particular, acetonitrile, tetrahydrofuran or water is used.

In principle, the ligands $L^1$ and $L^2$ may be present in any desired ligand combination, i.e. the metal complex (I) may contain, for example, a nitrate and an acetate radical, a p-toluenesulfonate and an acetate radical or a nitrate and a formally charged organic ligand, such as tert-butyl. $L^1$ and $L^2$ are preferably present as identical ligands in the metal complexes.

Depending on the formal charge of the complex fragment containing the metal M, the metal complexes contain anions X. If the M-containing complex fragment is formally neutral, the novel complex (I) contains no anion X. It is advantageous to use anions X which have very little nucleophilic character, i.e. very little tendency to have a strong interaction, whether ionic, coordinate or covalent, with the central metal M.

Suitable anions X are, for example, perchlorate, sulfate, phosphate, nitrate and carboxylates, for example acetate, trifluoroacetate, trichloroacetate, propionate, oxalate, citrate or benzoate, and conjugated anions of organosulfonic acids, such as methylsulfonate, trifluoromethylsulfonate and para-toluenesulfonate, and furthermore tetrafluoroborate, tetraphenylborate, tetrakis(pentafluorophenyl)borate, tetrakis [bis(3,5-trifluoromethyl)phenyl]borate, hexafluorophosphate, hexafluoroarsenate or hexafluoroantimonate. Perchlorate, trifluoroacetate, sulfonates, such as methylsulfonate, trifluoromethylsulfonate or p-toluenesulfonate, tetrafluoroborate or hexafluorophosphate are preferably used, in particular trifluoromethylsulfonate, trifluoroacetate, perchlorate or p-toluenesulfonate.

Examples of suitable defined transition metal complexes are:

[1,3-bis(di-5-hydroxypentyl)phospinopropane]palladium (II) acetate,

[1,3-bis(di-6-hydroxyhexyl)phosphinopropane]palladium (II) acetate,

[1,3-bis(di(3-hydroxycyclopentyl)propyl) phosphinopropane]-palladium(II) acetate,

[1,3-bis(di-8-hydroxyoctyl)phospinopropane]palladium(II) acetate and

[1,3-bis(di-3-hydroxycyclohexyl)propyl)phospinopropane]-palladium(II) acetate.

The transition metal complexes described are soluble at least in small amounts in water. As a rule, these metal complexes are readily to very readily soluble in water.

Defined transition metal complexes (I) can be prepared by the following processes.

For the neutral chelate complexes (p=0), the preparation is carried out by exchange of weakly coordinating ligands, for example 1,5-cyclooctadiene, benzonitrile or tetramethylethylenediamine, which are bonded to the corresponding transition metal compounds, for example transition metal halides, transition metal (alkyl) (halides) or transition metal-diorganyls, for the novel chelate ligands of the formula (III) having the meaning described above.

The reaction is carried out- in general in a polar solvent, for example acetonitrile, acetone, ethanol, diethyl ether, dichloromethane or tetrahydrofuran or a mixture therof, at from −78 to +60° C.

Furthermore, neutral metal complexes (I) in which $L^1$ and $L^2$ are each carboxylate, e.g. acetate, can be prepared by reacting transition metal salts, such as $Pd(OAc)_2$, with the chelate ligands (III) described in acetonitrile, acetone, ethanol, diethyl ether, dichloromethane, tetrahydrofuran or water at room temperature. Solvent mixtures may also be used here.

The reaction of the chelate complexes of the formula (I) with organometallic compounds of groups IA, IIA, IVA and IIB, for example $C_1$- to $C_6$-alkyls of the metals lithium, aluminum, magnesium, tin, and zinc, is suitable as a further method of synthesis, formally charged inorganic ligands $L^1$, $L^2$, as defined above, being exchanged for formally charged aliphatic, cycloaliphatic or aromatic ligands $L^1$, $L^2$ likewise as defined above. The reaction is carried out in general in a solvent, for example diethyl ether or tetrahydrofuran, at from −78 to 65° C.

Monocationic complexes of the formula (I) (p=1) can be obtained, for example, by reacting (chelate ligand) metal (acetate) (organo) or (chelate ligand) metal (halo)(organo) complexes with stoichiometric amounts of a metal salt M'X. The reactions are carried out in general in coordinating solvents, for example acetonitrile, benzonitrile or tetrahydrofuran, at from −78 to 65° C.

It is advantageous if the metal salts M'X fulfil the following criteria. The metal M' should preferably form sparingly soluble metal chlorides, for example silver chloride. The salt anion should preferably be a non-nucleophilic anion X as defined above.

Suitable salts for the formation of cationic complexes are silver tetrafluroborate, silver hexafluorophosphate, silver trifluoromethanesulfonate, silver perchlorate, silver para-toluenesulfonate, silver trifluoroacetate and silver trichloroacetate.

The dicationic complexes (p=2) are prepared similarly to the monocationic complexes except that in this case the (chelate ligand) metal (diacetate) and (chelate ligand) metal (dihalo) complexes are used as the precursor instead of the (chelate ligand) metal (acetate) (organo) or the (chelate ligand) metal (halo) (organo) complexes.

The reaction of $[Q_4M]X_2$ with the chelate ligands defined at the outset and of the formula (III) is suitable as a further process for the preparation of the dicationic complexes (I). Here, Q are identical or different weak ligands, for example acetonitrile, benzonitrile or 1,5-cyclooctadiene, and M and X have the meanings defined above.

A preferred process for the preparation of the metal complexes of the formula (I) is the reaction of the dihalo metal precursor complexes with silver salts containing non-coordinating anions.

The copolymerization of carbon monoxide and α-olefinically unsaturated compounds in the presence of the novel catalyst system is carried out in an aqueous medium. The polymerization mixture is preferably vigorously mixed in order to obtain reproducibly good productivities. Suitable stirring tools, such as anchor stirrers or helical ribbon impellers, may be used for this purpose. Suitable stirring speeds are from 250 to 1100 rpm, preferably above 290 rpm.

The carbon monoxide copolymer can in principle be obtained by two different procedures. In one preparation process, the abovementioned defined transition metal complexes (I) are used. These complexes are prepared separately and are added as such to the reaction mixture or initially taken in the reaction container. In a further preparation process, the components forming the catalytically reactive species are added individually to the reaction mixture. In this in situ generation of the catalyst, in general the metal M in salt form or as a complex salt is fed to the reaction vessel. Furthermore, the chelate ligand compound (III) and, if required, an activator compound are added. The addition of the activator species can be dispensed with if the chelate ligand (III) has radicals $R^1$ to $R^4$ which have at least one free sulfo or carboxyl group.

As a rule, the use of defined metal complexes (I) is associated with higher productivities than those of the in situ process. Suitable olefinically unsaturated monomer compounds in said processes for the preparation of carbon monoxide copolymers are both pure hydrocarbon compounds and hetero atom-containing α-olefins, such as (meth)acrylates or (meth)acrylamides and homoallyl or allyl alcohols, ethers or halides. Among the pure hydrocarbons, $C_2$- to $C_{20}$-1-alkenes are suitable. Among these, the low molecular weight α-olefins, e.g. α-olefins of 2 to 8 carbon atoms, such as ethene, propene, 1-butene, 1-pentene, 1-hexene or 1-octene, are noteworthy. It is of course also possible to use cylic olefins, e.g. cyclopentene, aromatic olefin compounds, such as styrene or α-methylstyrene, or vinyl esters, such vinyl acetate. Ethene or propene, in particular ethene, or a mixture of ethene with a low molecular weight α-olefin, such as propene or 1-butene, is particularly preferably used.

The molar ratio of carbon monoxide to α-olefin or to a mixture of α-olefins is as a rule from 5:1 to 1:5, usually from 2:1 to 1:2.

The copolymerization temperature is in general adjusted to from 0 to 200° C., copolymerization preferably being effected at from 20 to 130° C. The pressure is in general from 2 to 300, in particular from 20 to 220, bar.

Suitable activator compounds can be used for activating the catalyst. Suitable activator compounds are both mineral protic acids and Lewis acids. Suitable protic acids are, for example, sulfuric acid, nitric acid, boric acid, tetrafluoroboric acid, perchloric acid, p-toluenesulfonic acid, trifluoroacetic acid, trifluoromethanesulfonic acid and methanesulfonic acid. p-Toluenesulfonic acid and tetrafluoroboric acid are preferably used.

Suitable Lewis acids are, for example, boron compounds, such as triphenylborane, tris(pentafluorophenyl)borane, tris(p-chlorophenyl)borane or tris(3,5-bis(trifluoromethyl) phenyl)borane, or aluminum, zinc, antimony or titanium compounds having a Lewis acid character. Mixtures of protic acids or Lewis acids and protic and Lewis acids as mixture may be used.

The molar ratio of activator to metal complex (I), based on the amount of metal M, is in general from 60:1 to 1:1, preferably from 25:1 to 2:1, particularly preferably from 12:1 to 3:1 where the functional groups of the radicals $R^1$ to $R^4$ are not sulfo or carboxyl functionalities. Of course, activator compound b) can be added to the polymerization mixture also in the case of metal complexes having chelate ligands which carry the abovementioned functional acid groups.

The carbon monoxide copolymerization can be carried out either batchwise, for example in a stirred autoclave, or continuously, for example in a tube reactor, loop reactor or stirred kettle cascade.

In the novel polymerization process in an aqueous medium, average catalyst productivities which are in general based on 0.5 kg of polymer per g of metal per h are obtained. Productivities greater than 0.7 kg of polymer per g of metal per h can also be reproducibly achieved.

With the aid of the novel catalyst systems, the use of halogenated or aromatic hydrocarbons is avoided. Moreover, expensive separation operations are dispensed with. The novel processes accordingly provide an economical route for the simple preparation of linear, alternating carbon monoxide copolymers. Finally, the catalysts obtainable by the novel processes have a constantly high average catalyst activity even after a reaction time of several hours.

The examples which follow illustrate the invention.

EXAMPLES

I) Preparation of the Chelate Ligand Compounds

General Procedure i) Preparation of Propane-1,3-bis(di-ethyl phosphonite)

Triethyl phosphite (696 ml) was added to 1,3-dibromopropane (102.5 ml) and the mixture was heated slowly to 140° C. The resulting bromoethane was removed by distillation. After the evolution of bromoethane had declined, the reaction temperature was increased to 155° C. and the reaction was kept at this temperature for 24 hours. Further triethylphosphite (696 ml) was added dropwise and the reaction was stopped after a further 24 hours by separating off excess triethyl phosphite by distillation. Mono-substituted product was removed by distillation at 150° C. under greatly reduced pressure. The remaining distillation residue was propane-1,3-bis(diethyl phosphonite). Yield: 86%.

ii) Preparation of 1,3-diphosphinopropane

A solution of propane-1,3-bis(diethyl phosphonite) (103.3 g) in absolute diethyl ether (100 ml) was slowly added at 0° C. to a suspension of $LiAlH_4$ (25 g) in diethyl ether (200 ml). After the end of the addition, the reaction temperature was brought to room temperature and the reaction was stirred for 16 hours at this temperature. To hydrolyze excess $LiAlH_4$, degassed and argon-saturated 6 molar hydrochloric acid was slowly added. The organic phase separated off was dried over sodium sulfate. The aqueous phase was thoroughly mixed with diethyl ether and the diethyl ether phase was dried over sodium sulfate after phase separation and was combined with the abovementioned organic phase. 1,3-Diphosphinopropane was obtained by distillation at 140° C. under atmospheric pressure. Yield: 61%.

iii) Preparation of Water-Soluble Chelate Ligand Compounds

Bis(di-7-hydroxyheptyl)phosphinopropane, 1,3-diphosphinopropane (1.08 g) and 6-hepten-1-ol (44 mmol), which was repeatedly degassed and saturated with argon, were exposed to UV light from a high-pressure mercury lamp for 24 hours in a Schlenk-type quartz tube. In the case of higher olefins, the reaction vessel was additionally heated in order to reduce the viscosity of the reaction mixture. By separating off the excess olefin component by distillation, the desired chelate ligand compound was obtained virtually quantitatively.

Bis(di-5-hydroxypentyl)-, bis(di-6-hydroxyhexyl)-, bis(di-8-hydroxyoctyl)- and bis(di(3-hydroxycyclopentyl)propyl) phosphinopropane were obtained similarly to the abovementioned method.

The starting compounds 1-pentenol, 1-hexenol and 3-hydroxy-3-cylopentylpropene were obtained as follows:

4-Penten-1-ol was prepared from 4-pentenoic acid, commercially available from Aldrich, by means of $LiAl_4$ reduction. 6-Heptenoic acid and 7-octenoic acid were converted into 6-hepten-1-ol and 7-octen-1-ol, respectively, in a similar manner.

5-Hexen-1-ol was obtained from Fluka and was used without further purification.

3-Hydroxy-3-cyclopentylpropene was prepared from allylmagnesium chloride and cyclopentane via a Grignard reaction.

II) Preparation of Defined Transition Metal Complexes i) Preparation of [1,3-bis(di-5-hydroxypentyl)phosphinopropane]palladium(II) acetate 0.9 g of 1,3-bis(di-5-hydroxypentyl)phosphino propane was dissolved in 10 ml of repeatedly degassed and argon-saturated ethanol and slowly added dropwise to a solution of palladium(II) acetate (0.44 g in 15 ml of degassed, argon-saturated acetonitrile). To complete the reaction, stirring was continued for a further 20 minutes at room temperature. The solvent mixture was removed under reduced pressure and the defined Pd complex was isolated as a highly viscous, brown-yellow oil.

ii) Preparation of [1,3-bis(di-6-hydroxyhexyl)phosphinopropane]palladium (II) acetate The reaction was carried out similarly to II) i). The chelate ligand used was 1,3-bis(di-6-hydroxyhexyl) phosphinopropane.

iii) Preparation of [1,3-bis(di(3-hydroxycyclopentyl)propyl)phosphinopropane]-palladium(II) acetate A mixture of 1,3-bis(di(3-hydroxycyclopentyl)propyl) phosphinopropane in 20 ml of dichloromethane was added dropwise to a solution of 0.25 g of palladium(II) acetate in 20 ml of acetonitrile at room temperature. After stirring at room temperature for 16 hours, the solvent mixture was removed under reduced pressure. The desired Pd complex was isolated as a red solid.

III) Copolymerization of Carbon Monoxide and Ethene

Distilled water (100 ml), the desired amount of [1,3-bis(di-6-hydroxyhexyl)phosphinopropane]palladium(II) acetate and p-toluenesulfonic acid (five times the molar amount, based on the amount of catalyst used) were introduced into a 300 ml autoclave. The reaction vessel was first evacuated and was flooded with nitrogen. The nitrogen atmosphere was displaced by a 1:1 carbon monoxide/ethene mixture and the polymerization was carried out at the desired pressure and the desired temperature over a preselected period at a stirrer speed of 300 rpm. The reaction conditions were kept constant during the polymerization. The reaction was stopped by cooling and letting down the pressure on the reaction vessel. The copolymer isolated by filtration was washed with methanol (500 ml) and acetone (200 ml) and dried at 80° C. over a period of 5 hours under greatly reduced pressure.

The copolymerization parameters and results are shown in Table 1 below:

| Exp. | Amount of catalyst [mmol] | Duration [h] | Pressure [bar] | Temp. [° C.] | Activity [kg (PK)[a]/ g (Pd) /h] | Viscosity VZ[b] [ml/g] |
|---|---|---|---|---|---|---|
| 1 | 0.009 | 5 | 80 | 80 | 0.542 | 170 |
| 2 | 0.017 | 5 | 80 | 60 | 0.366 | 667 |
| 3[c] | 0.01 | 5 | 80 | 80 | 0.013 | n.d.[d] |
| 4 | 0.01 | 1 | 60 | 90 | 0.761 | n.d.[d] |

[a] PK = carbon monoxide/ethene copolymer
[b] Determined in a 0.5% strength by weight o-dichlorobenzene/phenol (1:1) solution with the aid of a capillary viscometer.
[c] Comparative experiment: [1,3-bis (diphenylphosphino) propane] palladium (II) acetate was used as catalyst.
[d] n.d. = not determined

We claim:
1. A process for the preparation of linear, alternating copolymers of carbon monoxide and a-olefinically unsaturated compounds, wherein the copolymerization is carried out in an aqueous medium in the presence of a catalyst system containing, as essential components
a) a metal complex of the formula (I)

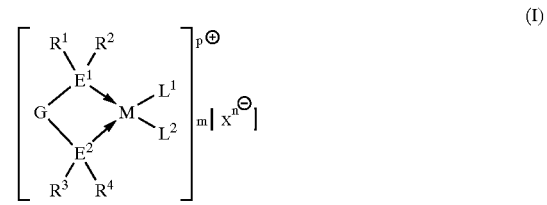

where
G is $-(CR^b_2)_r-$, $-(CR^b_2)_s-Si(R^a)_2-(CR^b_2)_t-$, -A'-O-B'- or -A'-Z($R^5$)-B'-
$R^5$ is hydrogen, or is $C_1$- to $C_{28}$-alkyl, $C_3$- to $C_{14}$-cycloalkyl, $C_6$- to $C_{15}$-aryl or alkylaryl where the alkyl radical is of 1 to 20 carbon atoms and the aryl radical is of 6 to 15 carbon atoms, each of which is unsubstituted or substituted by functional groups based on the elements of groups IVA, VA, VIA or VIIA of the Periodic Table of Elements, or is $-N((R^b)_2$, $-Si(R^c)_3$ or a radical of the formula II
where
q is an integer from 0 to 20 and the further substituents in (II) have the same meanings as in (I),
A' and B' are each $-(CR^b_2)_r-$ or $-(CR^b_2)_s-Si(R^a)_2-(CR^b_2)_t-$,
$R^a$ independently of one another, are each $C_1$- to $C_{20}$-alkyl, $C_3$- to $C_{10}$-cycloalkyl, $C_6$- to $C_{15}$-aryl or alkylaryl where the alkyl moiety is of 1 to 10 carbon atoms and the aryl moiety is of 6 to 15 carbon atoms,
$R^b$ is the same as $R^a$ or is hydrogen or $Si(R^c)_3$, $R^c$ is $C_1$- to $C_{20}$-alkyl, $C_3$- to $C_{10}$-cycloalkyl, $C_5$- to $C_{15}$-aryl or alkylaryl where the alkyl moiety is of 1 to 10 carbon atoms and the aryl moiety is of 6 to 15 carbon atoms, r is 1, 2, 3 or 4 r' is 1 or 2, s and t are each 0, 1 or 2, where $1 \leq s+t \leq 3$

Z is a nonmetallic element from group VA of the Periodic Table of Elements,

M is a metal selected from the group VIIIB, IB or IIB of the Periodic Table of Elements, $E^1$ and $E^2$ are each a nonmetallic element from group VA of the Periodic Table of Elements, $R^1$ to $R^4$ are each linear or branched $C_2$- to $C_{28}$-alkyl, $C_3$- to $C_{14}$-cycloalkyl or alkylaryl where the alkyl moiety is of 1 to 28 carbon atoms and the aryl moiety is of 6 to 15 carbon atoms, each of which is substituted by at least one polar protic or ionic functional group based on elements of groups IVA to VIA of the Periodic Table of Elements, $L^1$ and $L^2$ are formally charged or neutral ligands, X are formally monovalent or polyvalent anions, p is 0, 1, 2, 3 or 4, m and n are each 0, 1, 2, 3 or 4, and p=m×n, and optionally, one or more Lewis or protic acids or a mixture of Lewis and protic acids.

2. A process for the preparation of linear, alternating copolymers of carbon monoxide and a-olefinically unsaturated compounds, wherein the monomers are copolymerized in an aqueous medium in the presence i) of a metal M selected from the group VIIIB, IB or IIB of the Periodic Table of Elements, which is present in salt form or as a complex salt, ii) a chelate ligand of the formula (III)

$(R^1)(F^2)E^1\text{-}G\text{-}E^2(R^3)(R^4)$, where

G is $\text{—}(CR^b{}_2)_r\text{—}$, $\text{—}(CR^b{}_2)_g\text{—}Si(R^a)_2\text{—}(CR^b{}_2)_t\text{—}$, -A'-O—B'— or -'A-Z($R^5$)—B'—, $R^5$ is hydrogen or is $C_1$- to $C_{28}$-alkyl, $C_3$- to $C_{14}$-cycloalkyl, $C_6$- to 15-aryl or alkylaryl where the alkyl radical is of 1 to 20 carbon atoms and the aryl radical is of 6 to 15 carbon atoms, each of which is unsubstituted or substituted by functional groups based on the elements of groups IVA, VA, VIA or VIIA of the Periodic Table of Elements, or is $\text{—}N(R^b)_2$, $\text{—}Si(R^c)_3$ or a radical of the formula IIa)

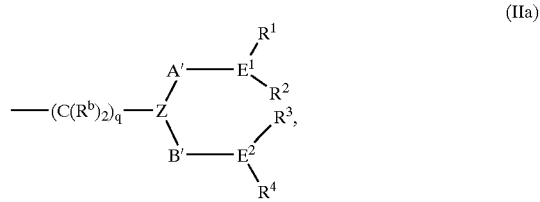

(IIa)

where q is an integer from 0 to 20 and the further substituents in (IIa)) have the same meanings as in (III), A' and B' are each $\text{—}(CR^b{}_2)_r\text{—}$ or $\text{—}(CR^b{}_2)_s\text{—}Si(R^a)_2\text{—}(CR^b{}_2)_t\text{—}$, $R^a$ independently of one another, are each $C_1$- to $C_{20}$-alkyl, $C_3$- to $C_{10}$-cycloalkyl, $C_6$- to $C_{15}$-aryl or alkylaryl where the alkyl moiety is of 1 to 10 carbon atoms and the aryl moiety is of 6 to 15 carbon atoms, $R^b$ is the same as $R^a$ or is hydrogen or $Si(R^c)_3$, $R^c$ is $C_1$- to $C_{20}$-alkyl, $C_3$- to $C_{10}$-cycloalkyl, $C_6$- to $C_{15}$-aryl or alkylaryl where the alkyl moiety is of 1 to 10 carbon atoms and the aryl moiety is of 6 to 15 carbon atoms, r is 1, 2, 3 or 4, r is 1 or 2, s and t are each 0, 1 or 2, where $1 \leq s+t \leq 3$ Z is a nonmetallic element from group VA of the Periodic Table of Elements, $E^1$ and $E^2$ are each a nonmetallic element from group VA of the Periodic Table of Elements, and $R^1$ to $R^4$ are each linear or branched $C_2$- to $C_{28}$-alkyl, $C_3$- to $C_{14}$-cycloalkyl or alkylaryl where the alkyl moiety is of 1 to 28 carbon atoms and the aryl moiety is of 6 to 15 carbon atoms, each of which is substituted by at least one polar protic or ionic functional group based on elements of groups IVA to VIA of the Periodic Table of Elements, and iii) optionally, one or more Lewis or protic acids or a mixture of Lewis and protic acids.

* * * * *

UNITED STATES PATENT AND TRADEMARK OFFICE
CERTIFICATE OF CORRECTION

PATENT NO. : 6,852,662 B2  
APPLICATION NO. : 10/692334  
DATED : February 8, 2005  
INVENTOR(S) : Queisser et al.

Page 1 of 1

It is certified that error appears in the above-identified patent and that said Letters Patent is hereby corrected as shown below:

In Claim 1, col. 14, indicated lines 57-58, after "formula II" and prior to "where" insert -- 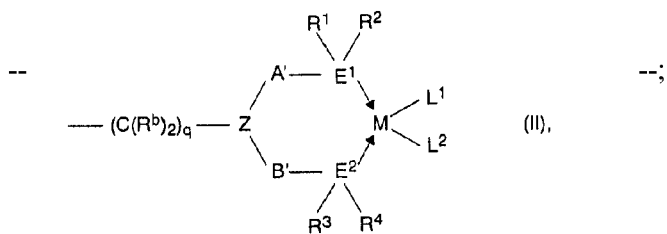 --;

In Claim 1, col. 15, indicated line 1: "$C_5$–" should read -- $C_6$– --;

In Claim 1, col. 15, indicated line 29: before "optionally" insert -- b) --;

In Claim 2, col. 15, indicated line 40: "$(F^2)$" in formula III should read -- $(R^2)$ --;

In Claim 2, col. 16, indicated line 18: "–$(CR^b{}_2)_r$–" should read -- –$(CR^b{}_2)_{r'}$– --;

In Claim 2, col. 16, indicated line 31: "r is 1 or 2," should read -- r' is 1 or 2, --.

Signed and Sealed this

Twenty-fifth Day of March, 2008

JON W. DUDAS  
*Director of the United States Patent and Trademark Office*